(12) United States Patent
Martin

(10) Patent No.: US 8,167,391 B2
(45) Date of Patent: May 1, 2012

(54) IMAGE REGISTRATION ON EDIBLE SUBSTRATES

(75) Inventor: Jeffrey Wes Martin, Jackson, TN (US)

(73) Assignee: The Procter & Gamble Company, Cincinnati, OH (US)

( * ) Notice: Subject to any disclaimer, the term of this patent is extended or adjusted under 35 U.S.C. 154(b) by 1499 days.

(21) Appl. No.: 11/398,294

(22) Filed: Apr. 5, 2006

(65) Prior Publication Data

US 2006/0228451 A1 Oct. 12, 2006

Related U.S. Application Data

(60) Provisional application No. 60/669,094, filed on Apr. 7, 2005.

(51) Int. Cl.
  *B41J 3/00* (2006.01)
  *B41J 29/38* (2006.01)
  *B41J 29/393* (2006.01)
(52) U.S. Cl. .................. 347/2; 347/14; 347/19
(58) Field of Classification Search .......... 347/106, 347/2, 14, 19
See application file for complete search history.

(56) References Cited

U.S. PATENT DOCUMENTS

| | | |
|---|---|---|
| 3,520,248 A | 7/1970 | MacKendrick |
| 3,576,647 A | 4/1971 | Liepa |
| 3,608,474 A | 9/1971 | Liepa |
| 3,626,466 A | 12/1971 | Liepa |
| 4,645,679 A | 2/1987 | Lee, III et al. |
| 4,769,650 A * | 9/1988 | Peng et al. ............ 347/4 |
| 4,872,024 A * | 10/1989 | Nagai et al. ............ 347/4 |
| 5,162,119 A | 11/1992 | Pappas et al. |
| 5,464,642 A | 11/1995 | Villagran et al. |
| 5,464,643 A | 11/1995 | Lodge |
| 5,534,281 A | 7/1996 | Pappas et al. |
| 5,992,973 A * | 11/1999 | Wen .................. 347/43 |
| 6,058,843 A * | 5/2000 | Young ............. 101/483 |
| 6,066,353 A | 5/2000 | Villagran et al. |
| 6,322,192 B1 * | 11/2001 | Walker ............. 347/19 |
| 6,796,631 B2 * | 9/2004 | Kojima ............. 347/19 |

(Continued)

FOREIGN PATENT DOCUMENTS

WO    WO 01/94116 A2    12/2001

(Continued)

OTHER PUBLICATIONS

Nathalie De Greef, International Search Report from the PCT/EP, Aug. 16, 2006.

*Primary Examiner* — Julian Huffman
(74) *Attorney, Agent, or Firm* — Adam W. Borgman; Amy M. Foust; S. Robert Chuey

(57) ABSTRACT

A method of making edible substrates that have an image registered on them in a consistent manner. The method comprises the steps of providing an edible substrate sheet, and an image source, wherein the image source has at least one image. Further, a trigger pulse signal is provided, which relays the frequency of a process element that is communicated to an image disposal device. The image disposal device uses the trigger pulse signal to determine when to dispose an image from the image source. Then an image is disposed on the edible substrate sheet with the image disposal device to form an image-disposed edible substrate sheet. And then a portion of the edible substrate sheet that comprises an image is separated into an individual piece.

4 Claims, 8 Drawing Sheets

U.S. PATENT DOCUMENTS

| | | | |
|---|---|---|---|
| 6,903,841 B2 * | 6/2005 | Spurgeon et al. | 347/102 |
| 7,186,429 B2 * | 3/2007 | Finkowski et al. | 426/383 |
| 7,216,952 B2 * | 5/2007 | Claramunt et al. | 347/19 |
| 7,593,563 B2 | 9/2009 | Wen et al. | |
| 7,665,815 B2 * | 2/2010 | Swett et al. | 347/9 |
| 7,933,443 B2 | 4/2011 | Wen et al. | |
| 2004/0159076 A1 * | 8/2004 | Finkowski et al. | 53/435 |

FOREIGN PATENT DOCUMENTS

| | | |
|---|---|---|
| WO | WO 01/94116 A3 | 12/2001 |

* cited by examiner

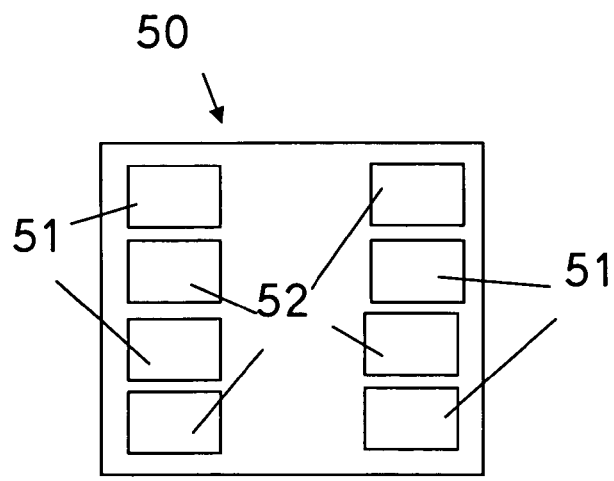
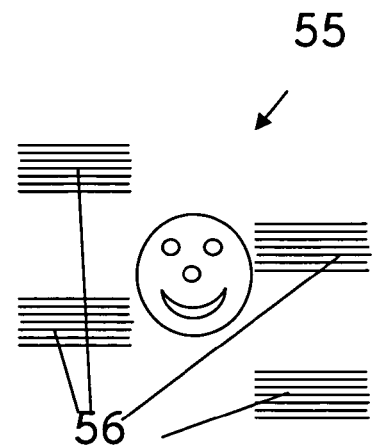
*Fig. 4*  *Fig. 5*
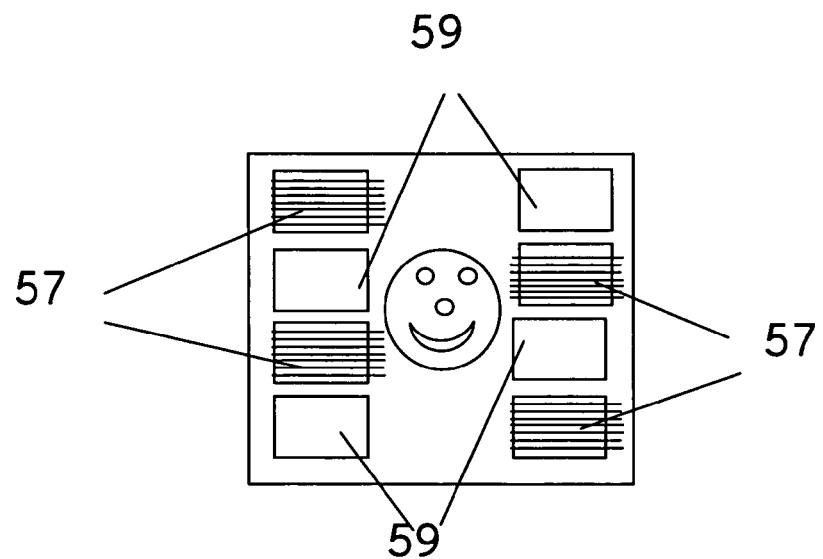
*Fig. 6*

IMAGE REGISTRATION ON EDIBLE SUBSTRATES

CROSS REFERENCE TO RELATED APPLICATIONS

This application claims the benefit of priority to U.S. Provisional Application Ser. No. 60/669,094, filed Apr. 7, 2005, which is herein incorporated by reference.

FIELD OF INVENTION

The present invention relates to edible substrates having an image disposed thereon, particularly to edible substrates wherein said image is in proper registration.

BACKGROUND OF THE INVENTION

Foods provide more than just physical sustenance. Food also provides enjoyment through means such as visual appeal. Many popular food items, such as cookies, cakes, and candies, comprise some sort of decoration that makes the food item more visually appealing. Printing on edible items such as snacks can provide an added level of excitement beyond the snacking itself. The printed content can be in the form of graphics, text or combinations, and it can be used to deliver, for example, games, stories, jokes, and educational facts. This new level of excitement may be, however, jeopardized by a printing system that does not fully print an image on an edible article, or prints such image out of registration. In such case, the image may not be legible or only a part of the image may be visible, causing consumer disappointment.

In the past, when printing on edible substrate sheets, properly registering an image to an individual portion has been achieved by mechanically linking the printer and the cutter. For example, in U.S. Pat. No. 5,534,281, issued Jul. 9, 1996, and U.S. Pat. No. 5,162,119, issued Nov. 10, 1992, both to Pappas et al., it is disclosed registration of images printed on a dough sheet such that a subsequent cutter separating a portion of a dough sheet will contain a printed image and the cutter and image are in registration. In this method, this is accomplished by mechanically linking the printer and the cutter as a single unit, wherein the printer is a rotary type, such that one revolution of the rotary printer roll corresponds to one revolution of the cutter roll. Disadvantages of such a unit include that the number of images that can be used is limited to those that can fit on the limited surface area of the printer roll as a function of the size of the printer roll, thus limiting the variety of printed images that can be supplied to consumers. Furthermore, if a greater number of images are desired, the roll would need to be changed with losses of production time to change the roll, etc. Also, the printer roll is required to contact the dough sheet that can have negative sanitation implications that are difficult to mitigate.

Accordingly, it would be desirable to provide a means to print images on an edible substrate sheet (e.g. dough sheet) whereby the number of images available for printing is not so limited and is not limited by constraints of the equipment, and still achieve proper image registration with a subsequent unit operation such as an edible substrate sheet cutter. Furthermore, it would be desirable to avoid contact of the edible substrate sheet by the printing means to avoid negative sanitation implications.

It would be, therefore, advantageous to devise methods to deliver printed content consistently on edible substrates with proper registration on edible substrates. Furthermore, it would be advantageous to do so with printing devices that allow for flexibility of image variety.

SUMMARY OF THE INVENTION

In one aspect, the present invention provides a method of making edible substrates having consistent registration of images disposed thereon. In one embodiment, the method comprises:
(a) providing an edible substrate sheet;
(b) providing an image source, wherein said image source comprises at least one image;
(c) providing a trigger pulse signal, wherein said trigger pulse signal relays the frequency of a process element;
(d) communicating the trigger pulse signal to an image disposal device, wherein the image disposal device uses the trigger pulse signal to determine when to dispose an image from said image source;
(e) disposing an image on said edible substrate sheet with said image disposal device to form an image-disposed edible substrate sheet;
(f) separating at least a portion of said edible substrate sheet to form at least one image-disposed edible substrate piece.

These and other features, aspects, and advantages of the present invention will become evident to those skilled in the art from reading of the present disclosure.

All documents cited herein are incorporated by reference in their entirety. The citation of any document is not to be construed as an admission that it is prior art with respect to the present invention.

BRIEF DESCRIPTION OF THE DRAWINGS

FIG. 4. Example of search pattern areas (50), (51) and (52).

FIG. 5. Example of reference image (55).

FIG. 6. Search pattern of FIG. 4 is overlaid on reference image of FIG. 5 to determine if image being analyzed is a reference image.

DETAILED DESCRIPTION OF THE INVENTION

Figure 1:
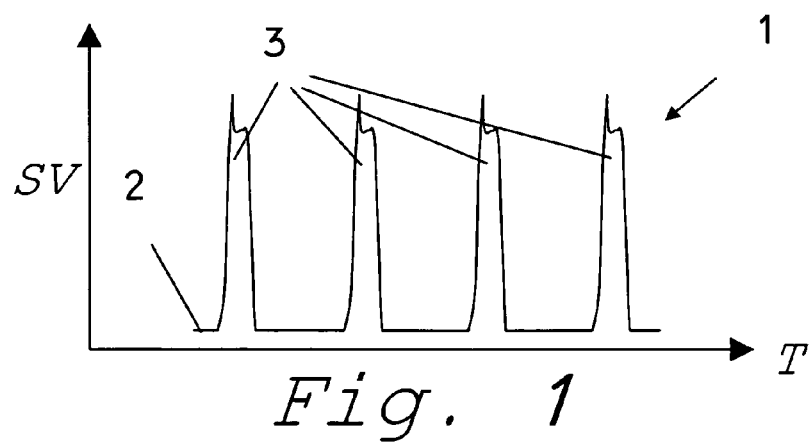
FIG. 1. Example of trigger pulse signal (1) with baseline (2) and four pulses (3).

Although the invention herein will generally be described in terms of printing on a dough sheet, it should be understood that any suitable edible substrate sheet and any suitable means of disposing an image thereon is within the scope of the present invention.

Preferred image disposal devices for use herein are those that enable the disposal of a large variety of images without a need to change a piece of equipment. For example, the images that can be printed are not limited by the physical constraints of the equipment. One such image disposal device for use herein can include ink jet printers, particularly piezoelectric drop-on-demand printers. Such ink jet printers can draw image information from an image source, such as a digital storage media, which can store as many images as desired.

However, using an ink jet printer, presents two specific problems. First, printing on a timely fashion to coincide with the cutting of dough pieces downstream from the printer. Second, printing at a speed that coincides with the speed of the dough sheet. Overcoming these two problems is not a problem of a printer roll as disclosed by Pappas et al., when the gears of the printer roll and cutter roll are mechanically connected such that both rolls move simultaneously and are located next to each other; however, when using ink jet printing, the synchronization between the two gears is not part of the system. Thus, some other means must be used to synchronize the printing of images with the subsequent cutting of the dough sheet to result in individual dough pieces having images properly registered thereon. One skilled in the art would recognize that such development could also be used to synchronize the printing of images with other unit operations as well, like, for example, seasoning application, spray application, embossing operation, or a secondary printing application.

a. Providing an Edible Substrate Sheet

According to the present invention, an edible substrate sheet is provided. The edible substrate sheet can be in the form of a continuous sheet or stream comprised of edible material that is later divided into many resulting individual pieces. In one embodiment, the edible substrate sheet is a dough sheet.

As used herein, "sheet" can include a substrate that has been shaped, extruded or roll-milled in such a way as to provide a flattened surface on the substrate.

As used herein, "stream" means a continuous source of substrates. For example, a stream of substrates can include a plurality of substrates such as that provided by a conveyor belt or as a feed from a continuous, semi-continuous, or batch process.

As used herein, "edible substrate" or "substrate" includes any material suitable for consumption that is capable of having an image disposed thereon. Any suitable edible substrate can be used with the invention herein. Examples of suitable edible substrates can include, but are not limited to, dough sheets. Furthermore, suitable edible substrates can include snack chips, fabricated snacks (e.g., fabricated chips such as tortilla chips, potato chips, potato crisps), extruded snacks, cookies, cakes, chewing gum, candy, bread, fruit, dried fruit, beef jerky, crackers, pasta, sheets of meat, sheets of cheese, pancakes, waffles, dried fruit film, breakfast cereals, and toaster pastries.

In a preferred embodiment, the edible substrate comprises a dough sheet used to fabricate a fabricated snack piece, preferably a fabricated snack chip, and more preferably a fabricated potato crisp. Suitable snack pieces include those described in "Chip Frying Machine," U.S. Pat. No. 3,520,248, issued Jul. 14, 1970, to MacKendrick; "Preparation of Chip-type Products," U.S. Pat. No. 3,576,647, issued Apr. 27, 1971, to Liepa; "Apparatus for Preparing Chip-Type Products," U.S. Pat. No. 3,608,474, issued Sep. 28, 1971, to Liepa; and "Molding Device for Preparing Chip-Type Products," U.S. Pat. No. 3,626,466, issued Dec. 7, 1971, to Liepa; Lodge in U.S. Pat. No. 5,464,643, and Villagran et al. in U.S. Pat. No. 6,066,353 and U.S. Pat. No. 5,464,642. In one embodiment, the fabricated snack chip is a fabricated potato crisp, such as that described by Lodge in U.S. Pat. No. 5,464,643, and Villagran et al. in U.S. Pat. No. 6,066,353 and U.S. Pat. No. 5,464,642. Other snack chips that can be used herein include those described in "Process for Making a Corn Chip with Potato Chip Texture," U.S. Pat. No. 4,645,679, issued Feb. 24, 1987 to Lee, III et al.

In addition, the edible substrate can include pet foods such as, but not limited to, dog biscuits and dog treats.

The edible substrate can be in any suitable form. For example, the substrate can be a finished food product ready for consumption, a food product that requires further preparation before consumption (e.g., snack chip dough, dried pasta), or combinations thereof. Furthermore, the substrate can be rigid (e.g., fabricated snack chip) or non-rigid (e.g., dried fruit film). In one embodiment, the edible substrates are connected to one another (e.g., in the form of a dough sheet prior to cutting the individual pieces).

As used herein, "fabricated snack piece" or "snack piece" is broad enough to include a snack piece that has not yet been separated (e.g., cut) from a dough. For example, in one embodiment, an image is disposed upon a dough sheet, then the dough sheet is later cut into individual pieces. Furthermore, "fabricated snack piece" or "snack piece" is broad enough to include both cooked (e.g., fried) and un-cooked (e.g., dough) substrates.

b. Providing an Image Source, Wherein Said Image Source Comprises at Least One Image As used herein an "image source" includes any collection of one or more images. For example, the image source can be an electronic (e.g., computer-based) database, a plurality of databases, or a collection of hard-copy images.

Images can be in any suitable form, preferably electronic media such as that generated using computer software and stored on an electronic storage device, such as a computer, computer disk, RAM, or ROM, or visual display. Any suitable computer system, as known in the art, can be used.

Images from said image source can be used by the image disposal device in any suitable sequence, such as a repeating sequence, at random, or any predetermined order.

Preferably, all the images in the image source are different from one another. However, in one embodiment, at least two of the images in an image source are the same.

Preferably, each image can be identified by an identifier, e.g., a sequential number or letter, that allows the image to be selected from the image source. For example, in one embodiment, each image is identified by a unique number (e.g., 100 images are each assigned a different number from 1 to 100). Assigning an identifier to each image allows for, among other things, cataloging of images and selection of images from the source by identifier (e.g., by number or letter). In another embodiment, an identifier is assigned to a portion of a cluster of images.

Any suitable image can be used. The image can comprise one or more graphic elements, one or more text elements, or combinations thereof. As used herein, "text" means one or more alpha-numeric symbols. Text can include letters, numbers, words, and combinations thereof.

As used herein, "graphic" means pictorial representation. For instance, the graphic can include objects, symbols, scenes, people, animals, toys, or characters. Suitable characters can include cartoon characters and licensed characters, as well as characters associated with popular personalities in the media, advertising, or well known in the particular culture.

Non-limiting examples of suitable images include letters, numbers, words, animals, cartoon characters, popular figures from the media, caricatures, historic events, and photographs.

Furthermore, images can be in the form of full or partial words, numbers, clues, hints, jokes, revelations, trivia quizzes, photographs, pictures, puzzles, stories, games, or sequence of events (e.g. animations). For example, the image can comprise the question portion of a trivia quiz. In one embodiment, the image depicts a piece of a jig-saw puzzle.

c. Providing a Trigger Pulse Signal, Wherein Said Trigger Pulse Signal Relays the Frequency of a Process Element When printing multiple images, it is necessary to instruct the printer when to begin printing each image. One such way of providing those instructions is via a trigger pulse signal. This trigger pulse signal can include those points in time when printing needs to occur such that the image is printed in proper registration, such that upon cutting the edible substrate sheet into pieces, the images are located on the pieces on the target location. As used herein, "signal" means an impulse or a fluctuating electric quantity, such as voltage, current, or electric field strength, whose variations represent coded information. For example, a trigger pulse of the trigger pulse signal is a change in the value of that signal which can be detected by the system to trigger an action (e.g., printing). Thus, a trigger pulse signal is a collection (e.g., sequence) of one or more trigger pulses distributed over a period of time, which instructs the system when to print, as instructed by each individual trigger pulse.

A trigger pulse signal comprises at least one trigger pulse. As used herein, a "trigger pulse" can trigger the system to dispose an image.

The trigger pulse signal is associated with the frequency of an element of the process ("process element") that is used to form or convey a particular portion of the dough sheet in processing (e.g., a particular portion that will be separated after printing to form an individual piece and that is desired to have a registered image printed thereon). For instance, when making a printed fabricated chip, the trigger pulse signal can be associated with the frequency of cutters cutting, or frequency of cooking molds receiving a dough piece. Any suitable process element can be used herein; for instance, the process element can be selected from a group of devices used to form or convey that portion of the dough sheet corresponding to an individual edible substrate, such as a forming device, cutting device, cutter mold, carrier mold, cooking mold, or conveying device. FIG. 1 shows a trigger pulse signal (1) having a baseline (2) and trigger pulses (3). The signal value (SV) is indicated by the vertical axis, which changes over time (T) indicated by the horizontal axis. Someone skilled in the art would realize that the trigger pulses may be based on a frequency change as opposed to an amplitude change as shown on FIG. 1. Furthermore, the trigger pulses may be based on an amplitude change (e.g., low amplitude to high amplitude). Furthermore, the trigger pulses may be based on a bit change for data-based signals.

The trigger signal can be of any suitable type. For instance, the trigger signal can be electrical, light, magnetic, or a combination thereof.

In one embodiment, the trigger signal correlates to the frequency at which individual substrates are moving through the line (e.g., are being conveyed through the line). The frequency can tell how many substrates are being conveyed per unit of time, and can remain constant (e.g., if the line speed is constant) or can change over time. This frequency is incorporated into the trigger pulse signal in the form of properly spacing the trigger pulses. This proper spacing is accomplished by synchronizing the generation of the trigger pulses to the process element to create a trigger pulse signal. In one embodiment, the frequency at which fabricated snack chips are produced matches the frequency at which printing of individual images on the dough sheet occurs.

Figure 2:
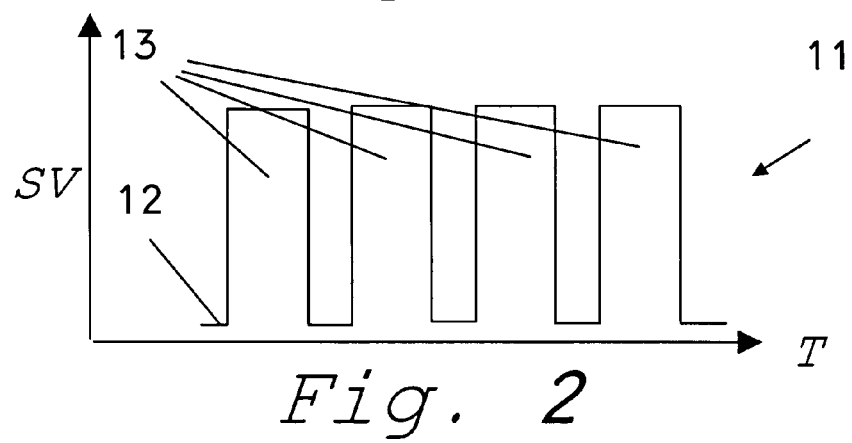
FIG. 2. Example of adjusted trigger pulse signal (11) with baseline (12) and four pulses (13), wherein, the pulses have been cleaned of noise, and adjusted for their magnitude and duration.

The creation of a trigger pulse signal may lead, however, to a signal that is not readily useable (e.g., readable) by a printing system. Thus, it may be necessary to adjust the signal such that it is usable by the system. Such adjustment can include, for example, insuring that each trigger pulse is of sufficient magnitude and duration to be detectable by the printer, or removing signal noise. Furthermore, even if the signal is usable by the system, the signal may require adjustment such that the system prints the images in proper registration, as discussed below. FIG. 2 shows an adjusted trigger pulse signal (11) having a baseline (12) and trigger pulses (13). The signal value (SV) is indicated by the vertical axis, which changes over time (T) indicated by the horizontal axis.

As used herein, "proper registration" means that an image is disposed on the sheet such that the image is located on a predetermined location on the individually separated substrate containing that image. Accordingly, the method herein can be used to achieve registration of images in a reproducible manner over a plurality of separated edible substrates.

In a particular embodiment, the trigger pulses are generated by an algorithm that takes into account the speed of a process element and portions of that process element that are directly related to individual edible substrates. For example, knowing the rotational speed of a cutter roll and both the number and spacing of cutter molds on its periphery, trigger pulses can be generated that correspond to the frequency of flow of individual edible substrates.

Figure 3:
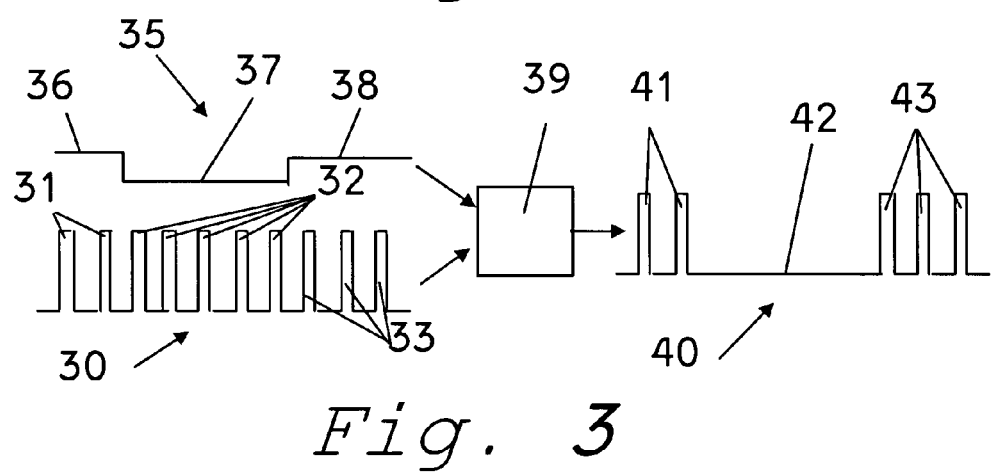
FIG. 3. Status signal (35) and trigger pulse signal (30) are combined in signal processing unit (39) to form an adjusted trigger pulse signal (40).

Although the trigger pulse signal provides a frequency, it may not always be desirable to use that frequency such that an image is printed. In a particular embodiment, a status signal is used to provide information relating to the condition of a portion of the system. In another embodiment, a status signal can communicate whether to print or not print. This information can be used to determine if a particular trigger pulse will be used for printing or not. As used herein, a "status signal" communicates information regarding the status of at least a portion of the system. In one embodiment, multiple status signal sources can be used with the invention herein to provide information to determine whether an image should be printed as a result of any particular trigger pulse. For instance, a particular combination of status signals can be used to communicate that printing should occur. In one embodiment, all status signals must communicate print readiness in order for printing to occur. In another embodiment, a certain combination of status signals must communicate print readiness in order for printing to occur.

d. Communicating the Trigger Pulse Signal to an Image Disposal Device, Wherein the Image Disposal Device Uses the Trigger Pulse Signal to Determine When to Dispose an Image from Said Image Source The trigger pulse signal and, optionally, the status signals, are communicated to a signal processing unit (e.g., computer) to form an adjusted trigger pulse signal. The adjusted trigger pulse signal comprises a message understandable by the printer, that indicates to the printer when to print and when not to print. Thus, the status signal communicates information that is used to decide whether to dispose an image or not (e.g. whether the disposal of an image should occur even if it is indicated by the trigger pulse signal). FIG. 3 shows an example of a trigger pulse signal (30) with sets of trigger pulses (31), (32) and (33) and a status signal (35) with portions (36), (37) and (38), as inputs to a signal processing unit (39), which processes signals (30) and (35) to create an adjusted trigger pulse signal (40) that maintains sets of trigger pulses (41) and (43) equivalent to the set of trigger pulses (31) and (33) of trigger pulse signal (30), but not maintaining trigger pulses in time period (42) corresponding to the time period of trigger pulses (32) as indicated by portion (37) of the status signal (35), being of a predetermined value different than the predetermined value of portions (36) and (38) of the status signal (35).

In one embodiment, information is evaluated against set criteria to determine whether during a certain point in time printing should be executed or not; if those criteria are satisfied, then printing occurs as indicated by the relevant trigger pulses during said certain point in time.

The status signal can communicate a message about any suitable element of interest to a particular system (e.g., if the mill is running, then dough is there). There can be multiple signal sources that communicate whether a particular part of the system is enabled or disabled at a particular point in time. For instance, a status signal can communicate, among other things, that a cutter is removed, dough is not present, dough is present, dough is torn, some defect in the dough, dough will be discarded, or a stuck chip is in a frying mold (e.g., do not print because the portion of dough that would have gone into that frying mold will be discarded).

The status signal can be in any suitable form. For instance, the status signal can be electrical, magnetic, light, or a combination thereof.

In one embodiment, the status signal and trigger pulse signal are communicated to a signal processing unit (e.g., computer) to form an adjusted trigger pulse signal. As used herein, the "adjusted trigger pulse signal" results from a combination of the status signal and the trigger pulse signal. In a particular embodiment, the trigger pulse signal is communicated to a signal processing unit (e.g., computer) to form an adjusted trigger pulse signal. The adjusted trigger pulse signal is "readable" by the printing system, and communicates whether to print or not to print an image, or at what particular point to print it.

In one embodiment, the trigger pulse signal relays the frequency of a process element to a signal processing unit, where the trigger pulse signal is processed and adjusted to incorporate 1) time delays, or 2) information (e.g., status signals). As used herein, a "time delay" is a form of calibration delay; the time delay ensures that the images are in proper registration. The time delay works in combination with the printing frequency indicated by the trigger pulse signal to determine the time at which an image is disposed, either before or after a trigger pulse is due to occur by a time magnitude equal to the time delay.

As used herein, a "delay" can be either positive (+) or negative (−). The delay can be adjusted in order to position the timing of printing. In one embodiment, the trigger pulse is used to keep images in registration, but the system is first calibrated by either manually moving the print head or adjusting the delay. If the delay is positive (+), then printing is set to occur after the trigger pulse signal by a time magnitude equal to the delay or as a function of the delay value. If the delay is negative (−), then printing is desired to occur before the trigger pulse signal by a time magnitude equal to the delay or as a function of the delay value. In this case, for example, a feedback loop can be incorporated in the system to determine if an adjusted trigger pulse was ahead of the original trigger pulse by the proper time amount after printing occurs, as a function of the negative (−) delay. This measures performance of anticipating a trigger pulse after the fact, and can result in more variability. It is preferred to use positive (+) delays.

In a particular embodiment, a calibration step is used to either adjust the delay applied to each trigger pulse, or to adjust the location of the print head such that proper registration is achieved. For instance, a registration mark that is sensed by a sensor can be used (e.g., registration mark is printed on the sheet next to where each piece will be printed, or one every 100 images, etc.); if the system senses the mark, then the system will print in registration. Otherwise, the time delay must be adjusted to move subsequent registration marks back into the pre-determined sensor area; the intervening time between is the delay from then on forward in the process.

The time delay can be determined manually, such as by continuously adjusting the time delay and visually monitoring the location where the images are printed in relation to the target location on the individual edible substrates. Once this calibration is done, the printer system can rely on the trigger pulse signal and the so determined time delay to print at the appropriate points in time that result in individual edible substrates with images registered in the target location.

Figure 13:
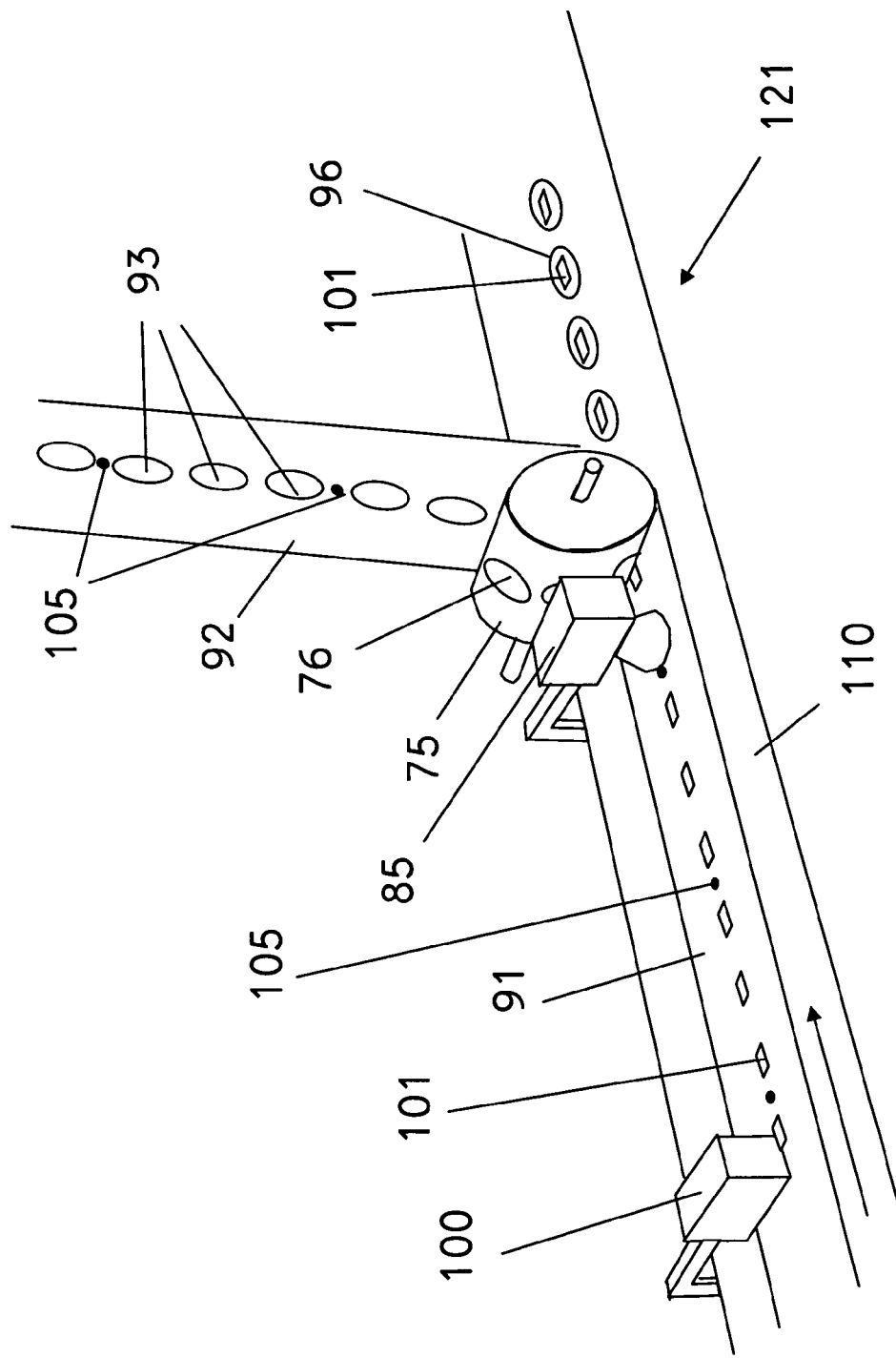
FIG. 13. Dough sheet (91) print process (121) with camera sensor (85), cutter (75) and images printed in registration (101) with cut dough pieces (96).
Figure 14:
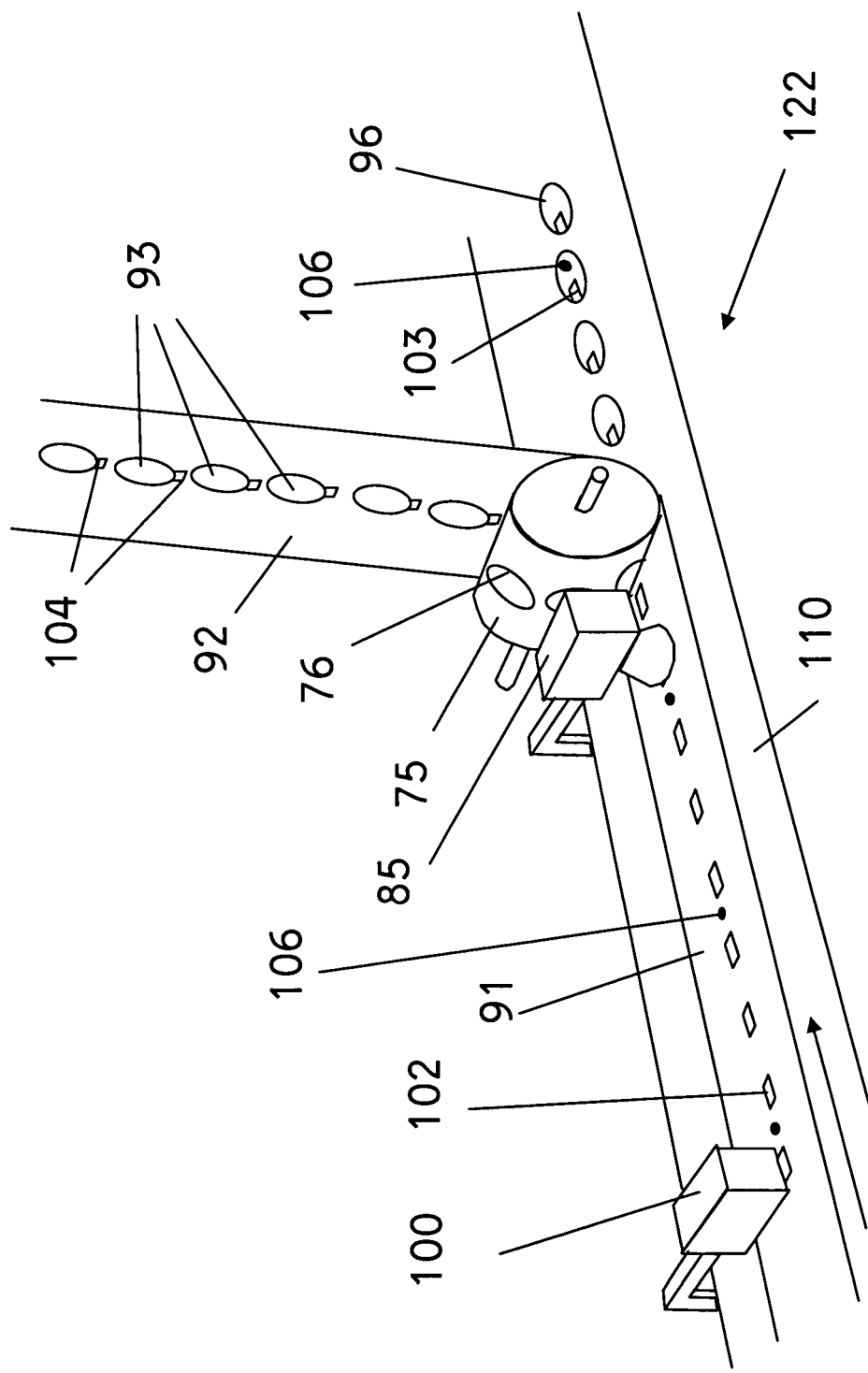
FIG. 14. Dough sheet (91) print process (122) with camera sensor (85), cutter (75) and images (102) printed out of registration with cut dough pieces (96) and resulting into partial images (103) and (104).

Alternatively, the time delay can be determined automatically, such as by use of a registration mark. The registration mark could be an image printed for that purpose or it could be an image intended to be part of the finished product. Also, the image could be printed in an area of the edible substrate intended to become part of the finished product or not. In either case, such registration mark is detected by a sensor located in proximity to the unit that separates the edible substrate (e.g. a cutter roll for a dough sheet), or further downstream in the process, such that a comparison can be made between were the registration mark is and where it should be in the individual edible substrate. The closer the sensor is to the cutter, the more accurate the registration will be. When this comparison is made, the system can then determine or adjust the time delay until the images are printed in proper registration. For example, FIG. 13 shows the use of registration marks (105). In this example, a printer (100) prints on a dough sheet (91) that will be eventually cut into dough pieces (96) by a cutter roll (75), to be further transferred to frying molds for frying of the dough. One row of dough pieces (96) are cut with a rotary cutter (75), and images (101) are printed on the dough sheet (91) for each of the eventually to be cut individual dough pieces (96). Around each dough piece (96) is a web of dough (92) that will be recycled and mixed with fresh dough. A registration mark (105) is printed every three images in the portion of the dough sheet (91) that will become the web (92). A sensor (85) detects the registration mark (105) near to where the dough pieces are cut.

Figure 9:
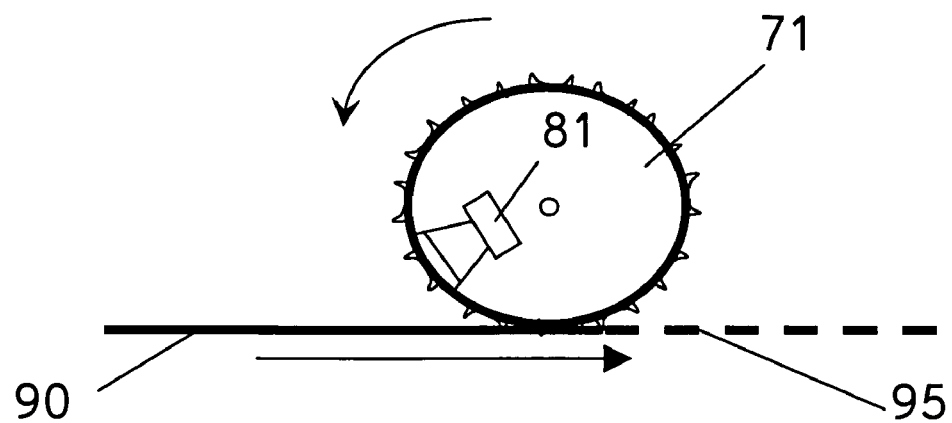
FIG. 9. Exemplary cutter roll (71) with incorporated sensor (81).

The sensor could be located within the cutter roll. FIG. 9 shows an example of a dough sheet (90) being cut into individual dough pieces (95), with a cutter roll (71) that comprises a sensor (81) within. In this example, the sensor (81) rotates as the cutter roll (71) rotates. The sensor (81) can be adjacent to or within a cutter mold in the periphery of the cutter roll (71), and as the sensor (81) reaches the dough sheet (90) once per revolution, it detects the presence and location of an image such as a registration mark, in relation to the cutter mold, or the lack of an image.

Figure 10:
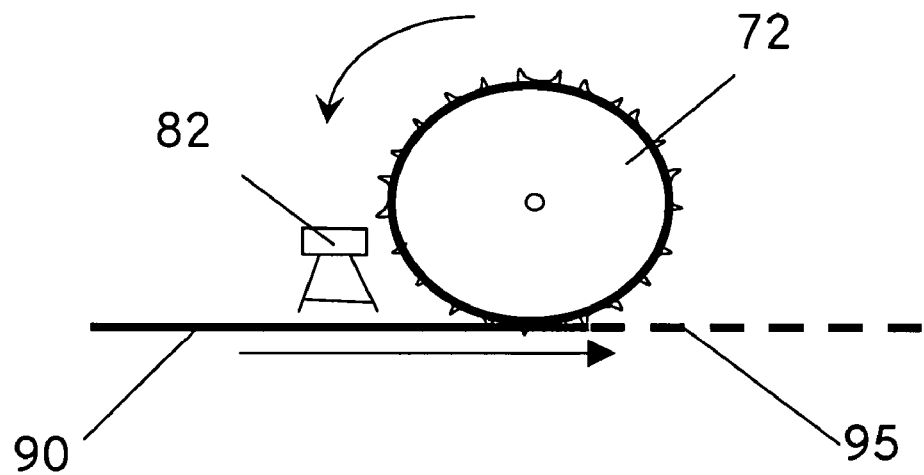
FIG. 10. Exemplary sensor (82) location prior to cutter roll (72).
Figure 11:
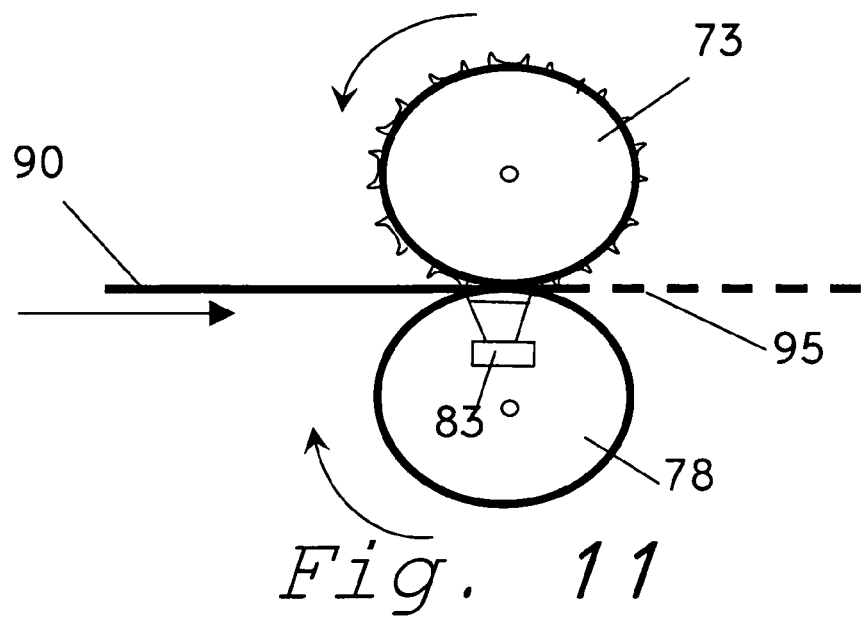
FIG. 11. Exemplary cutter support roll (78) with incorporated sensor (83).
Figure 12:
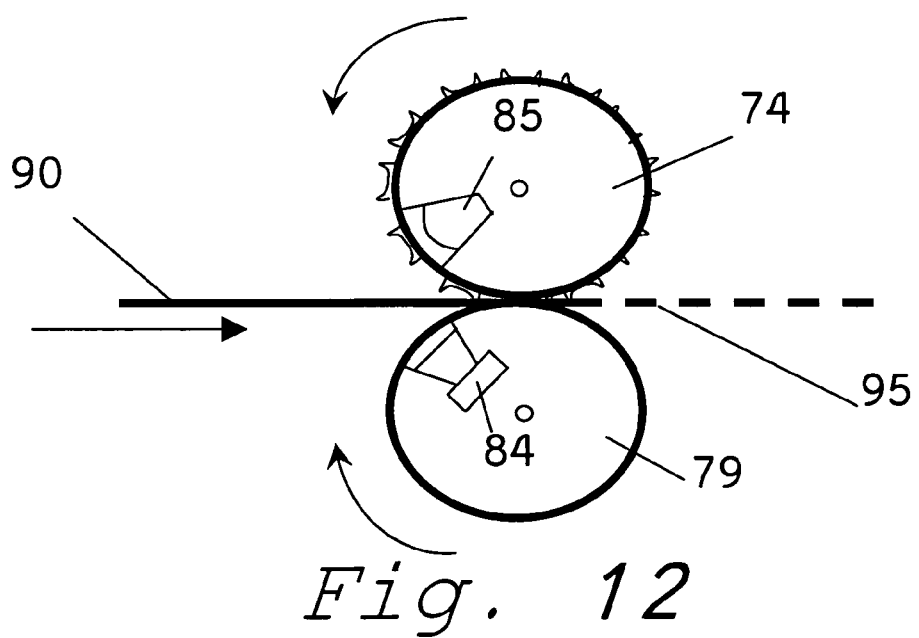
FIG. 12. Exemplary cutter support roll (79) with incorporated sensor (84) and matching cutter roll (74) with incorporated light aid (85) to aid sensor (84).

Alternatively, the sensor could be located outside the cutter. FIG. 10 shows an example of a dough sheet (90) being cut into individual dough pieces (95), with a cutter roll (72) and a sensor (82) located above the dough sheet (90) to detect images on the dough sheet prior to reaching the cutter roll (72). FIG. 11 shows an example of a dough sheet (90) being cut into individual dough pieces (95), with a cutter roll (73), and a cutter support roll (78) that comprises a sensor (83) within. In this example, the sensor (83) rotates as the cutter support roll (78) rotates. The sensor (83) is located to coincide with a point on the cutter roll (73) near a mold of the cutter roll (73). As the sensor (83) reaches the dough sheet (90) once per revolution, it detects the presence and location of an image such as a registration mark, in relation to the cutter mold, or the lack of an image. If the image is printed on the face of the dough that faces the surface of the rotary cutter (73), and this creates difficulties to the sensor (83) to detect images (e.g., images are on the opposite side of the dough), then a light could be used from within the cutter roll to enhance the contrast of the printed mark against the surrounding not printed dough area. As many dough sheets are translucent, this approach can enable the sensor to better detect the registration mark. FIG. 12 shows an example of this, wherein the cutter roll (74) comprises a light source (85) and the cutter support roll (79) comprises the sensor (84) that matches up with the light source once per revolution.

Alternatively, a time delay is not used, and, rather, the image disposal device is moved along the length of the dough sheet until proper registration of images on the individual dough pieces is achieved. Once this manual calibration is done, the printer system can rely on the trigger pulse signal to print at the appropriate points in time that result in individual edible substrates with images registered in the target location. Alternatively, the distance between the image disposal device and the subsequent unit operation, like the cutter operation, is adjusted to accomplish the manual calibration. Furthermore, alternatively, the speed of the substrate may be adjusted independent of the subsequent unit operation to accomplish the manual calibration.

Just as the image disposal device can be moved along the length of the dough sheet to calibrate the registration, we must note that the reverse inadvertent change of the distance (or time) between the image disposal device and the subsequent unit operation, like a cutting operation, can result in loss of registration. For example, a sudden air entrapment underneath the dough sheet that was not there earlier, in a location between the image disposal device and the cutting operation, may result in change of the distance that the dough sheet may travel between the image disposal device and the cutting operation, resulting in a loss of registration. Note that air entrapment is not necessarily what causes the loss of registration, but rather the change in the amount of air entrapment. In general, means will be used to maintain constant the distance between the image disposal device and subsequent unit operation, like cutting. Methods to control the potential variation in the said distance as a result of changes in the amount of air entrapment, can include, but are not limited to, use of rollers or forced air over the dough sheet to keep it pressed against the conveyor belt, or use of vacuum under the conveyor belt to remove such air.

In one embodiment, a signal is generated from the cutter unit, transfer roll, or other key system area, and processed to form an adjusted printer trigger pulse. Adjusting the signal in this manner to form an adjusted signal pulse provides a signal the printer can read, as well as allows for the incorporation of status signals.

In one embodiment, an image to be printed with an ink jet printer comprises rows and columns of dots each of which is intended to comprise ink or to be left blank. Columns extend along the length of the dough sheet in the direction of dough sheet movement. Rows are at an angle versus the columns. In one particular case, the rows are perpendicular to the columns with an angle of 90 degrees. The distance between columns as printed on the dough sheet is a function of how the ink jet printer is positioned over the dough sheet and how far apart the ink jet nozzles are from one another in the print head. The distance between rows as printed on the dough sheet is a function of how fast the dough sheet is moving and how fast the ink jet printer is instructed to print consecutive rows. If the dough sheet is made to move faster and the speed of printing consecutive rows is not changed, then an image will appear stretched. To avoid this, the speed at which the dough sheet moves is measured and a jetting frequency is communicated to the image disposal device to correspond with the speed of the dough sheet. In one embodiment, the jetting frequency is communicated to the image disposal device by a jetting frequency signal that, similar to the trigger pulse signal, comprises a trigger pulse for each row of dots to be printed. The jetting frequency signal can be created automatically (e.g., a sensor determines the speed of the dough sheet which is then communicated appropriately to the image disposal device) or manually (e.g., with a rheostat).

In one embodiment, the jetting frequency is created automatically with the aid of an encoder unit. An encoder unit produces a signal with trigger pulses as a function of the rotation speed of the encoder unit shaft and the characteristics of the specific encoder unit. For example, some encoder units are designed to produce one trigger pulse per revolution of the encoder shaft, while others are designed to produce a finite number of trigger pulses per revolution of the encoder shaft (e.g., 500 trigger pulses per revolution). In a particular embodiment, a wheel is connected directly to the encoder shaft, and the wheel is located above the dough sheet, which is made to move with the motion of the dough sheet. As the wheel motion makes the encoder shaft move as well, a signal can be generated from the encoder unit. In an alternate embodiment, the wheel is connected indirectly to the encoder shaft via a set of mechanical gears to scale the rotation speed of the shaft to a specific speed as a function of the speed of the dough sheet. In one embodiment, the signal produced by the encoder unit is the jetting frequency signal. In another embodiment, the signal produced by the encoder unit is used to create the jetting frequency signal.

In one embodiment, an encoder measures the speed at which a dough sheet is moving indirectly (e.g. by measuring the speed of the dough sheet belt conveyor). In one embodiment, the dough sheet speed is converted through an algorithm to a jetting frequency signal (e.g., number of KHz or thousands of ink droplets printed per second by an ink jet nozzle), which determines how quickly the image disposal device prints. In another embodiment, a rheostat can be used to adjust the jetting frequency of the image disposal device.

In one embodiment, an encoder measures the speed at which a dough sheet is moving, and this speed is used in conjunction with the distance between the image disposal device and the subsequent unit operation, like cutting, to determine an automatic adjustment to the previously determined time delay. The previously determined time delay is specific for a given substrate speed, and as the substrate speed changes, it may be necessary to adjust the time delay. If the dough sheet speed decreases, then it will take a longer time for a printed image that has just been disposed on the dough sheet to reach the cutter, and the extra time it takes to get there represents that less time delay is needed for a given trigger pulse signal to print in registration with a subsequent cutter operation. Analogously, if the speed of the dough sheet is increased, then it will take a shorter time for a printed image that has just been disposed on the dough sheet to reach the cutter, and the lesser time it takes to get there represents that additional time delay is needed for a given trigger pulse signal to print in registration with a subsequent cutter operation. Someone skilled in the art should be able to calculate the adjustment for the time delay, given the initial and new dough sheet speeds, and the distance from printer to cutter.

e. Disposing an Image on Said Edible Substrate Sheet with Said Image Disposal Device to Form an Image-disposed Edible Substrate Sheet The trigger pulse signal, or the adjusted trigger pulse signal, is then communicated to an image disposal device. The computer uses the trigger pulse signal (or adjusted trigger pulse signal) to determine when to begin to dispose an image from the image source. The trigger pulse triggers disposal of an image to at least a portion of the substrate sheet to form image-disposed edible substrate sheet. Alternatively, the trigger pulse can communicate that an image should not be disposed.

The trigger pulse communicates to the image disposal device to dispose an image on the substrate sheet to form image-disposed edible substrates. As used herein, an "image-disposed edible substrate" is an edible substrate having an image disposed thereon. The disposed image can cover part or all of the visual portion of the edible substrate. In addition, the image can include one or more text or graphics disposed upon said edible substrate.

As used herein, "disposed on" means that one element can be integral with another element, or that one element can be a separate structure bonded to or placed on another element. Thus, the image can be applied directly or indirectly to the edible substrate, applied to a material that is placed on the edible substrate, applied within the edible substrate, or other variations or combinations thereof. In particular embodiments, the image can be printed, sprayed, or otherwise applied directly on the surface of the substrate. In other embodiments, the image can be applied to a material placed on the surface of the substrate.

Any suitable means of disposing an image on the substrate can be used herein. For example, the image can be printed, drawn, painted, or otherwise attached to the edible substrate. The image can be single-color or multi-color. The image can comprise dyes, pigments, other natural or synthetic substances, flavors or combinations thereof.

For instance, in one embodiment, an ink jet printer is used to dispose the images. For example, a piezoelectric drop-on-demand ink jet printer can be used with the present invention herein.

The image can be disposed on the edible substrate before or after a cooking process (e.g., before or after a dough sheet is baked or fried). Furthermore, the image can be disposed on the edible substrate before or after it is cut into individual pieces (e.g., before or after a dough sheet is cut into individual cookie or snack chip pieces).

In one embodiment, the image is printed on the substrate. Methods of printing can include, but are not limited to, laser and ink jet (e.g., thermal bubble jet, piezoelectric drop-on-demand, continuous ink jet).

In another embodiment, an edible sticker comprising an image is affixed to the substrate.

In another embodiment, a thin film comprising an image is affixed to the substrate via edible adhesive.

In a preferred embodiment, an ink jet image is printed on a fabricated snack chip.

In one embodiment, more than one surface of the edible substrate has an image disposed thereon. For example, a plurality of image disposal devices can be employed, each one to dispose an image on different sides of the edible substrate (e.g., top, bottom, and/or side)

In one embodiment, the image disposal device comprises a printer. Preferably, digital printing is used, such as ink-jet printing systems (e.g., continuous jet, drop-on-demand), such as those described in WO 01/94116 by Willcocks et al., published Dec. 13, 2001. In a preferred embodiment, an inkjet printer disposes images on a dough sheet, which is cut into individual pieces then fried to form fabricated snack chips.

f. Separating the Edible Substrate Sheet into Individual Pieces

In one embodiment, the adjusted trigger pulse signal enables the cutting mechanism to coincide with a portion of the edible substrate comprising an image. The trigger mechanism enables the location of the image such that the cutter coincides. In this example, the cutter is passive and the printer via the trigger pulse signal is active. By "passive," it is meant that the cutter does not seek to cut in a specific location coinciding with an image location; by "active," it is meant that the printer, via the trigger pulse signal (or adjusted trigger pulse signal), anticipates when to print an image such that the image is in proper registration with the subsequent cutting.

Any suitable cutter can be used. For instance, rotary or stamp cutters can be used.

In one embodiment, the adjusted trigger pulse signal enables the cutting mechanism to coincide with that of the image location. Because the printing system used herein is "active," this allows the individual pieces cut from the edible substrate sheet to be cut in such a manner that each image is registered properly on the corresponding individual piece. Thus, the use of a "passive" cutter, which cuts at the same place on the sheet as it comes through, can be used herein for making individual pieces with registered images.

g. Alternate Embodiments of the Invention

In another aspect, the present invention provides a method for consistent image registration, wherein the stream of edible substrates is conveyed by a conveyor belt, comprising:
  (a) a stream of edible substrates;
  (b) a conveyor belt to convey said stream of edible substrates;
  (c) an image disposal device located in proximity to said stream of edible substrates;
wherein the image disposal device is in closer proximity to a higher tension portion of the conveyor belt than to a lower tension portion of the conveyor belt.

Preferably, the printing occurs on a portion of the conveyor belt that is higher than the median tension, at least in near proximity to the high tension zone.

In one embodiment, the highest tension ("high tension zone") of the belt is that portion which is greater than the median tension of the belt. In another embodiment, the highest tension of the belt is the top portion of the belt, wherein the belt has two shafts. In a particular embodiment, the high tension zone is past the drive shaft, in the machine direction, or the portion of the conveyor belt that is being pulled by the drive shaft. In another embodiment, the high tension zone is the area of the entire belt, wherein said belt has the same tension throughout, preferably wherein said belt is made of metal. Conveyor belts tend to experience a more consistent movement next to the drive shaft pulling them, where the belt is in high tension, maintaining a speed that is closely aligned to the tangential speed of the drive shaft. Locating an image disposal device in closer proximity to the high tension zone, makes use of the improved speed consistency and enables improved registration of images. Lower tension zones tend to accommodate belt slack and this can result in speed upsets from one moment to the next that are less desirable for printing in registration.

In a particular embodiment, the method for consistent image registration comprises:
 (a) a stream of an edible substrates;
 (b) a conveyor belt to convey said stream of edible substrates, wherein said conveyor belt comprises a drive shaft; and
 (c) an image disposal device;
wherein the image is disposed on a portion of the stream of edible substrate that is located between 0 and 30 feet (0 and 9.1 meters) of the closest drive shaft for the conveyor belt. Preferably the image is disposed on a portion of the stream of edible substrate that is located between 0 and 20 feet (0 and 6.1 meters) of the closest drive shaft for the conveyor belt, more preferably 0 and 10 feet (0 and 3 meters), yet more preferably 0 and 5 feet (0 and 1.5 meters) and most preferably 0 and 2 ft (0 and 0.6 meters).

Alternatively, the dough sheet is held more firmly to the conveyor belt to minimize slipping of the dough sheet on the conveyor belt that can negatively affect image registration. This can be achieved by vacuum holding the sheet down on the conveyor belt from under the belt or by using pinch rollers that would hold the sheet from both top and bottom sides while turning to assist the sheet forward movement.

An alternative use of the trigger pulse signal described comprises using it as a comparison element against a second signal that records pulses corresponding to when individual images have been printed or later detected on edible substrates. In this embodiment, the pulses from the trigger pulse signal are not used to trigger printing of images, but rather, they are compared with the pulses of the second signal in time to determine if a pulse from the trigger pulse signal has a corresponding pulse in the second signal, and also that pulses from the second signal occur at the same frequency within a time period as pulses in the trigger pulse signal. If the frequency of occurrence of pulses in the second signal does not match the frequency of pulses in the trigger pulse signal, then this event can be used to increase or decrease the printing frequency until the frequency of occurrence of pulses in the second signal matches the frequency of occurrence of pulses in the trigger pulse signal. Also, once the frequencies match, if a corresponding pulse in the second signal does not occur simultaneously or within certain time tolerance of a given pulse in the trigger pulse signal, then this can be used as an indication that the calibration time delay needs to be adjusted in proportion to the time difference between the occurrence of the given pulse and the corresponding pulse in the second signal to ensure proper registration of images takes place.

h. Image Quality Control

In another aspect of the invention, a camera is used to capture photographs of the printed images on the edible substrate for quality control. The captured photographs are then analyzed by an operator or by a computer for a number of attributes. A strobe light is used in conjunction with the camera to photograph the desired image disposed on a moving edible sheet. The strobe light illuminates the edible substrate (e.g, printed dough sheet) very briefly to capture the instant when the printed image passes by the camera. The contrast between the areas of the edible substrate containing ink versus that of areas not containing ink can be analyzed.

Figure 7:
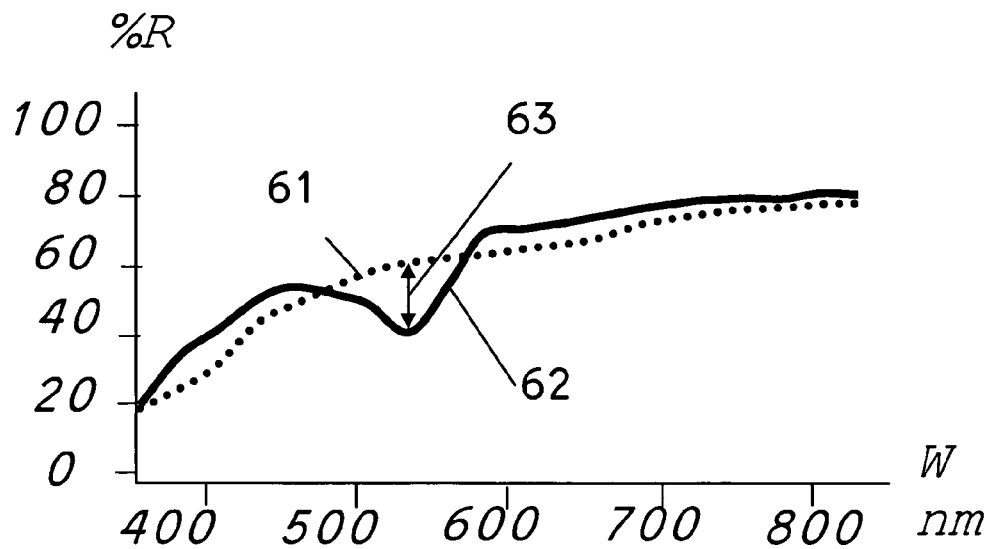
FIG. 7. Spectral profile of an exemplary magenta ink (62) on a dough sheet and of the dough sheet base (61). The vertical axis represents percent of light reflected on the specific substrate at the various light wavelengths of the horizontal axis.
Figure 8:
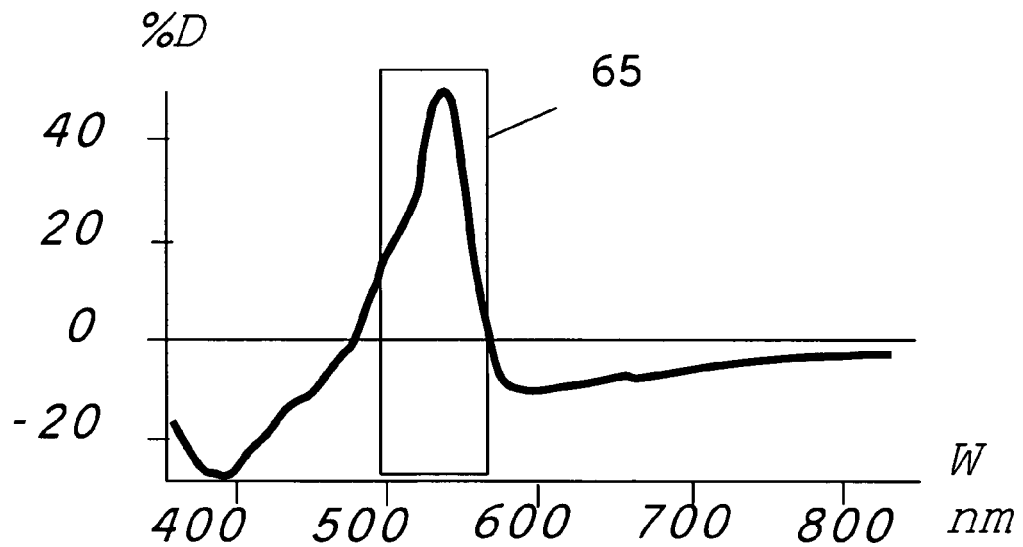
FIG. 8. Percent difference of the spectral profiles of FIG. 7 from the spectral profile of the substrate with the exemplary magenta ink. Highlighted box (65) indicates region of highest contrast.

A filter passing light in a specific portion of the wavelength spectrum could be used to further improve the contrast between areas of the edible substrate containing ink and areas that do not contain ink. The specifications for a given filter can be determined by comparing the spectral profile of the edible substrate with ink and the edible substrate base without ink. The spectral profile of a material shows the percent of light reflectance off the surface of the material (% R) over the spectrum of light wavelength. FIG. 7 shows exemplary spectral profiles for a non-printed dough sheet (61) and for the same dough sheet with magenta ink on it (62). FIG. 8 shows that the difference between both spectra expressed as a percentage (% D) of the magenta ink spectrum indicates a region of maximum difference between the two spectral profiles between about 500 nanometers (nm) and 560 nm, highlighted by box (65). In this particular example, a filter passing light between 500 nm and 560 nm would reduce overall image brightness but would provide for better contrast detection between ink and substrate. Such filter could be used to filter the light reflected off the edible substrate before it reaches the camera. Alternatively, the filter could be used to filter the light of the strobe light before it reaches the edible substrate to be reflected.

The camera and the strobe light are triggered off the same trigger pulse signal used to trigger the image disposal device. A time delay from the point that the image disposal device prints is used to trigger the camera and strobe light as a function of how far downstream the camera and strobe light are located, and how fast the edible substrate is moving.

When the camera captures a photograph of the edible substrate, the photograph can be analyzed to determine if it contains the corresponding image disposed by the image disposal device, if it is positioned properly, and if other potential problems exist. The analysis focuses on contrast areas found on the captured photograph. From the found contrast areas, a true center of the image can be calculated and compared to an expected center location that will deliver registered images on the individual edible substrates upon being cut with a cutter. Deviations of the calculated true center from the expected center indicate problems of positioning. Also, a boundary can be set within which a photograph is expected to contain contrast areas. If contrast is seen outside of the designated boundaries, then this could indicate poor positioning of images on the edible substrate or other contamination of the edible substrate. If, however, no contrast areas are found when they are expected, this could indicate an equipment failure.

A specific image, known as a reference image, can be used to conduct more detailed analysis. The reference image is designed with specific features that the camera will analyze. Such reference image may be detectable by the vision system for further analysis, or the vision system is made to expect it ahead of time for further analysis. Preferably the vision system is able to recognize the reference image so that additional analysis can be triggered. In one embodiment the frequency of more detailed analysis is determined by the frequency of disposing the reference image. The more detailed analysis may include, for example, tests for the performance of individual nozzles of a print head. Also, failure by the vision system to find the reference image on an expected frequency can indicate various failures of either printing system or vision system capability.

Detection of the reference image can occur by detection of at least one specific design element of the reference image. For example, a design element comprises a vertical line extending across the whole image that can be found by the vision system. In another example, the reference image design comprises a specific pattern of ink density that can be detected by the vision system (e.g. ink in all four corners of the image and none in the middle). FIG. 4 shows an example of a search pattern for a vision system wherein boxes (51) designate areas where a high ink density is expected and (52) designate areas where a low ink density is expected. If a photograph meets these criteria, then that indicates that the photograph contains a picture of a reference image that could be analyzed further. FIG. 5 shows an example of a reference image with areas of high ink density (56), and FIG. 6 shows the same reference image of FIG. 5 with the search pattern of FIG. 4 overlapped, that shows how the reference image meets the exemplary predetermined criteria, wherein areas (57) have high ink density corresponding to the search areas (51) of the search pattern (50) and also corresponding to the areas of high ink density (56) of reference image (55), and areas (59) have low or none ink density corresponding to the search areas (52) of the search pattern (50).

Testing for the performance of individual nozzles of a print head is an important aspect of producing high quality images. If a portion of the nozzles used to dispose an image malfunction (e.g. become plugged), then parts of the intended image will not be disposed. This can lead to image defects. The severity of the defect increases with increasing number of malfunctioning nozzles (e.g., 90 malfunctioning nozzles out of 256 nozzles is more severe than 20 out of 256 nozzles), or if the malfunctioning nozzles concentrate in an area of the print head width (e.g., if there is several malfunctioning nozzles consecutive or near to one another). A reference image can incorporate a region of specific ink density that have been printed by a number of ink jet nozzles. Preferably each ink jet nozzle contributes equally towards the ink density of the image. If the sensor detects that the measured ink density is lower than expected, it could indicate one or more jet nozzles malfunctioning. In one embodiment the number of ink jet nozzles malfunctioning is proportional to how much lower ink density is measured in the region versus what is expected when all ink jet nozzles are jetting properly.

EXAMPLE

The present invention is demonstrated by the following non-limiting example.

Example 1

Figure 15:
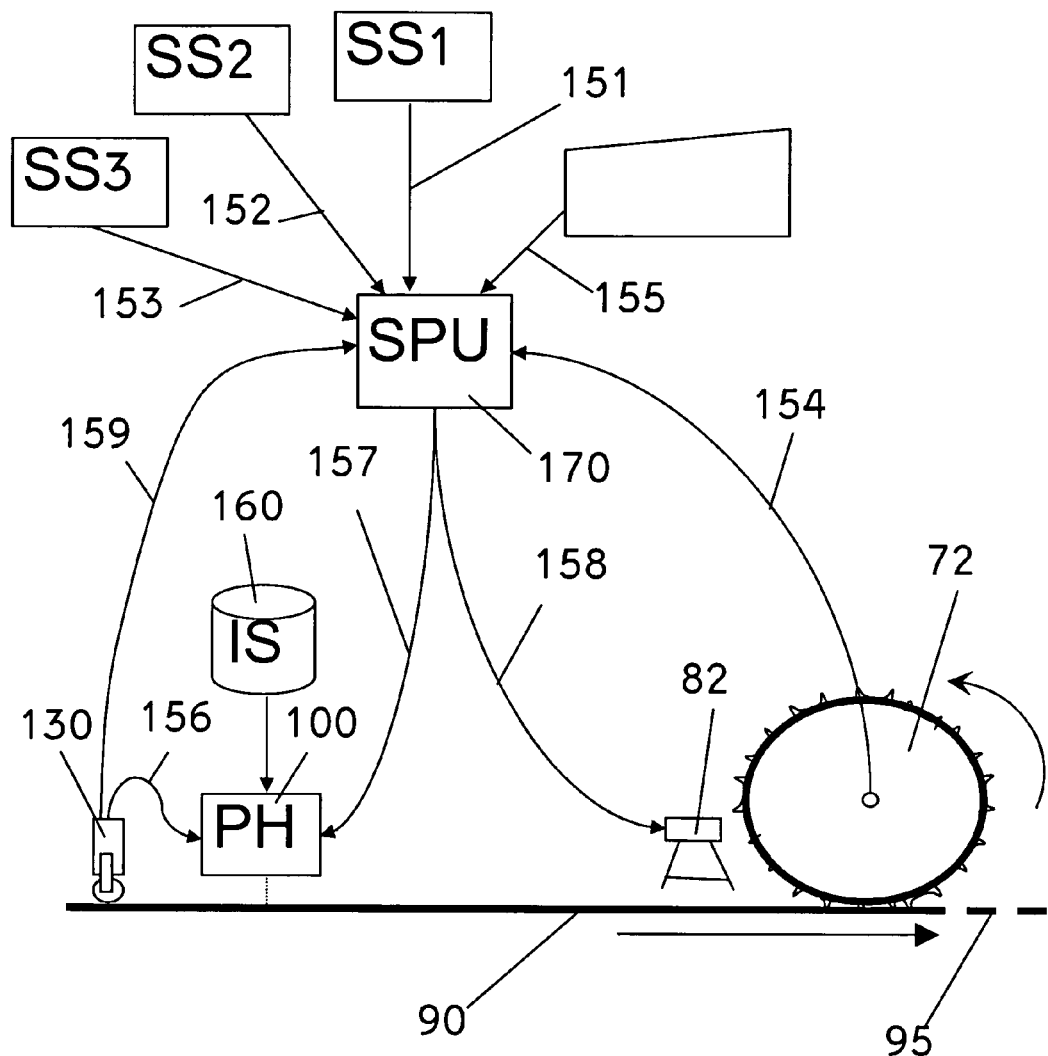
FIG. 15. Process diagram to print images in registration

FIG. 15 shows an overview of an exemplary set up for practicing the present invention. A dough sheet 90 is conveyed towards a rotary cutter (72) with a stationary axis to for form individual dough pieces (95). It is desired to dispose images from the image source (160) on the dough sheet (90) with an ink jet print head (100) that are registered with the subsequent cutting performed by the cutter roll (72), and to result in image disposed dough pieces (95). A trigger pulse signal (154) is created from the cutter roll (72) that comprises the frequency of cutter molds of the cutter roll (72) cutting the dough sheet (90) in the form of trigger pulses distributed over time, wherein each trigger pulse corresponds to a cut performed by the cutter roll (72). The trigger pulse signal (154) is input to the signal processing unit (170) that processes said signal to produce adjusted trigger pulse signals (157) and (158) while considering exemplary status signals (151), (152), and (153), a manually input calibration time delay (155), and optionally an encoder signal (159). The adjusted trigger pulse signal (157) is used by the ink jet printer (100) to determine when to begin disposing of each image. The adjusted trigger pulse signal (158) is used by the camera system (82) to determine when to capture pictures of the dough sheet (90) to correspond with instances when the images are in line of sight of the camera sensor (82). An encoder (130) generates a jetting frequency signal (156) and (159) based on the measured speed of the dough sheet (90) by a wheel connected to the encoder shaft that moves as the dough sheet (90) moves. The jetting frequency (156) is communicated to the ink jet printer (100) so it prints all corresponding rows of dots of an image at a speed that corresponds appropriately with the speed of the dough sheet (90) to deliver a consistent image length from image to image. The optional jetting frequency (159) can be communicated to the signal processing unit (170) to provide for automatic adjusting of the provided time delay signal (155), as a function of a potential speed change of substrate (90) as measured by the encoder (130), and also as a function of the distance between the ink jet print head (100) and the point where the cutter roll (72) separates a portion of the substrate (90) to form image disposed dough pieces (95).

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making edible substrates having consistent registration of images disposed thereon, wherein said method comprises:
   (a) providing an edible substrate sheet having at least one image disposed thereon;
   (b) providing a trigger pulse signal, wherein said trigger pulse signal relays the frequency of a process element;
   (c) communicating the trigger pulse signal to a piezoelectric drop-on-demand ink jet printer, wherein the piezoelectric drop-on-demand ink jet printer uses the trigger pulse signal to determine when to record an image to said edible substrate sheet;
   (d) communicating a recorded image to an image analyzer, wherein said image analyzer determines whether the edible substrate image meets predetermined criteria; and
   (e) disposing the recorded image on said edible substrate sheet with said piezoelectric drop-on-demand ink jet printer wherein the edible substrate image meets said predetermined criteria;
       wherein said edible substrate sheet is a fabricated snack dough sheet
       wherein said fabricated snack dough sheet comprises a material selected from the group consisting of potato, rice, corn, wheat, and combinations thereof;
       wherein a camera having a filter lens to increase the contrast between the printed image and the edible substrate sheet is used with a strobe light to produce the recorded image; and
       wherein said camera and said strobe light are triggered off the same trigger pulse signal used to trigger said printer.

2. The method of claim 1, wherein said image analyzer determines whether the actual location of a printed image corresponds with the target location for said printed image.

3. The method of claim 2, wherein the piezoelectric drop-on-demand ink jet printer is located before a cutter unit and the target location is analyzed in relation to the cutter.

4. The method of claim 2, wherein the ink jet printer is located after a cutter unit and the target location is analyzed in relation to the outline of the cut piece.

* * * * *